(12) United States Patent
Jonckheree et al.

(10) Patent No.: US 9,551,110 B2
(45) Date of Patent: Jan. 24, 2017

(54) FLUOROCHEMICAL COMPOSITION AND USE THEREOF

(71) Applicant: CLARIANT INTERNATIONAL LTD., Muttenz (CH)

(72) Inventors: Eric Jonckheree, Cuise la Motte (FR); Frederic Mabire, Arcueil (FR); Rainer Nusser, Neuenburg (DE); Qian Tang, Oberwil (CH)

(73) Assignee: ARCHROMA IP GMBH, Reinach (CH)

( * ) Notice: Subject to any disclaimer, the term of this patent is extended or adjusted under 35 U.S.C. 154(b) by 342 days.

(21) Appl. No.: 14/363,547

(22) PCT Filed: Dec. 13, 2012

(86) PCT No.: PCT/EP2012/005174
§ 371 (c)(1),
(2) Date: Jun. 6, 2014

(87) PCT Pub. No.: WO2013/091804
PCT Pub. Date: Jun. 27, 2013

(65) Prior Publication Data
US 2014/0322543 A1    Oct. 30, 2014

(30) Foreign Application Priority Data

Dec. 21, 2011 (EP) .................... 11010033

(51) Int. Cl.
| | | |
|---|---|---|
| *C08G 18/08* | (2006.01) |
| *C08G 18/30* | (2006.01) |
| *C08G 18/70* | (2006.01) |
| *D06M 15/576* | (2006.01) |
| *D21H 17/11* | (2006.01) |
| *D21H 19/16* | (2006.01) |
| *D21H 21/16* | (2006.01) |
| *D21H 19/10* | (2006.01) |
| *C08G 18/28* | (2006.01) |
| *C08G 18/78* | (2006.01) |
| *C08G 18/79* | (2006.01) |
| *D21H 23/04* | (2006.01) |
| *D21H 23/22* | (2006.01) |

(52) U.S. Cl.
CPC .......... *D21H 19/10* (2013.01); *C08G 18/0809* (2013.01); *C08G 18/0814* (2013.01); *C08G 18/2885* (2013.01); *C08G 18/7831* (2013.01); *C08G 18/792* (2013.01); *D06M 15/576* (2013.01); *D21H 17/11* (2013.01); *D21H 21/16* (2013.01); *D21H 23/04* (2013.01); *D21H 23/22* (2013.01); *D06M 2200/10* (2013.01); *D06M 2200/11* (2013.01); *D06M 2200/12* (2013.01); *Y10T 428/31544* (2015.04)

(58) Field of Classification Search
None
See application file for complete search history.

(56) References Cited

U.S. PATENT DOCUMENTS

| | | | |
|---|---|---|---|
| 3,446,761 A | 5/1969 | Antonelli et al. |
| 3,553,179 A | 1/1971 | Bartlett |
| 5,276,175 A | 1/1994 | Dams et al. |
| 2004/0077238 A1 | 4/2004 | Audenaert et al. |

FOREIGN PATENT DOCUMENTS

| | | |
|---|---|---|
| CN | 1656280 A | 8/2005 |
| CN | 102216361 A | 10/2011 |
| EP | 273449 A | 7/1988 |
| EP | 435641 A | 7/1991 |
| EP | 1038919 A1 | 9/2000 |
| WO | 03100158 A1 | 12/2003 |
| WO | 2008/138927 A | 11/2008 |

OTHER PUBLICATIONS

International Search Report received in PCT/EP2012/005174 mailed Jun. 12, 2013.

*Primary Examiner* — Ramsey Zacharia
(74) *Attorney, Agent, or Firm* — McBee Moore Woodward Vanik IP LLC

(57) ABSTRACT

The instant invention relates to the Fluorochemical composition comprising a dispersion or a solution of a fluorinated compound, wherein said fluorinated compound comprises the reaction product of at least two reactants A and B wherein reactant A being a compound of formula (I);

$$R_f\text{—O—}(CF(CF_3)CF_2O)_m CF(CF_3)\text{—X—Y—Z} \qquad (I)$$

with
$R_f$ being a perfluorinated alkyl group,
m being from 3 to 25;
X being a carbonyl group or CH2;
Y being a chemical bond or an organic divalent or trivalent linking group bearing a functional or difunctional isocyanate reactive group;
Z being an organic group bearing at least one cationic group, reactant B being a polyfunctional isocyanate or a mixture thereof
and optionally one or more isocyanate-reactive co-reactants C.

26 Claims, No Drawings

FLUOROCHEMICAL COMPOSITION AND USE THEREOF

CROSS REFERENCE TO RELATED APPLICATIONS

This application is a §371 National Stage Application of PCT/EP2012/005174, filed Dec. 13, 2012, which claims priority to EP 11010033.6, filed Dec. 21, 2011.

BACKGROUND

Field of the Invention

The present invention relates to fluorochemical compositions that can be obtained by reacting a polyisocyanate compound with at least one particular isocyanate reactive fluorinated polyether compound bearing at least one cationic group, and their use for rendering substrates like paper, textiles and leather oil repellent.

Description of Related Art

Commercially available oil- and/or water repellent compositions are typically based on fluorinated compounds that have a perfluorinated aliphatic group. Such compositions are also described for example in U.S. Pat. No. 5,276,175 and EP-A-435 641. The commercial success of this type of compositions can be contributed to their high effectiveness.

Fluorinated compounds based on perfluorinated ether moieties have also been described in the prior art for rendering fibrous substrates oil- and water repellent. For example perfluorinated polyether compounds have been disclosed in EP-A-1-038 919, EP-A-273 449, U.S. Pat. No. 3,553,179 and U.S. Pat. No. 3,446,761. It was found that previously disclosed compositions based on perfluorinated polyether compounds may not be very effective in rendering substrates oil- and/or water repellent.

An important requirement for the treatment of paper to make it suitable for use in contact with food, is the minimization of any risk of contamination of the packaged food by any substances which are harmful or potentially harmful for human and animal health. The optimum situation is when the paper doesn't contain any harmful substances at all or at least doesn't release harmful substances during its use.

The fluorochemicals should impart the required oleophobic characteristics to the treated paper.

Perfluoroalkyl derivatives are generally mixtures of molecules of different chain length, containing four to twenty carbon atoms. The disadvantage of this kind of chemistry is the difficulty to completely eliminate the undesired, persistent and bioaccumulative pollutants perfluorooctanoic acid (PFOA) and perfluorooctanesulfonic acid (PFOS). The challenge is to find PFOA/PFOS free fluorochemicals with the same or similar application performance compared to existing products.

The compounds disclosed in WO-03/100158 tried to overcome the obstacles of the prior art and describes fluorochemical compositions comprising a dispersion or a solution of a fluorinated compound, wherein the fluorinated compound is the reaction product of a fluorinated polyether and a polyisocyanate. The here described compositions are useful for rendering fibrous materials oil- and water repellent.

However, it has shown that the compositions described by WO 03/100158 cannot be solubilized or dispersed sufficiently in glycol or glycol/water mixtures, which is necessary in order to apply the fluorochemical composition evenly on fibrous substrates, in particular on paper.

Surprisingly, it was found that an isocyanate-reactive fluorochemical polyether bearing at least one cationic group, when reacted with a polyfunctional isocyanate, provides for a PFOA/PFOS free fluorochemical compound that are extremely good soluble or dispersible in glycol or glycol/water mixtures and can therefore by applied evenly on fibrous substrates and that show afterwards unexpected good performance in respect to oil- and/or water repellency, in particular when used on paper.

SUMMARY

The invention therefore relates to a fluorochemical composition comprising a dispersion or a solution of a fluorinated compound, wherein said fluorinated compound comprises the reaction product of at least two reactants A and B wherein reactant A being a compound of formula (I);

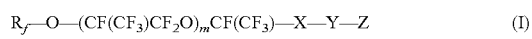

$$R_f\text{—O—}(CF(CF_3)CF_2O)_m CF(CF_3)\text{—X—Y—Z} \qquad (I)$$

with
$R_f$ being a perfluorinated alkyl group,
m being from 3 to 25;
X being a carbonyl group or $CH_2$;
Y being a chemical bond or an organic divalent or trivalent linking group bearing a functional or difunctional isocyanate reactive group;
Z being an organic group bearing at least one cationic group,
reactant B being a polyfunctional isocyanate or a mixture thereof
and optionally one or more isocyanate-reactive co-reactants C.

Preferably, reactant A is a mixture of compounds of formula (I), with m being from 4 to 22.

Reactant A has an average molecular weight of from 750 to 4000 g/mol, more preferably of from 1000 to 3000 g/mol and even more preferably of from 1500 to 2500 g/mol.

In a preferred embodiment reactant A further contains 0 to 10% by weight, more preferably of from 0 to 5% by weight, even more preferably of from 0 to 1% by weight, especially preferably of from 0 to 0.1% by weight, the % by weight based on the total weight of reactant A, compounds with a molecular weight of less than 750 g/mol.

DETAILED DESCRIPTION OF A PREFERRED EMBODIMENT

Preferably, reactant A is a compounds of formula (I), with X being a carbonyl group.

In a particular embodiment reactant A is a compound of formula (I), with Y being a linking group comprising one or two isocyanate-reactive groups including thiol, hydroxyl and amino groups, more in particular amino groups, such as secondary amino groups.

Reactant A may be a compound of formula (I), wherein Z is a linking group bearing at least one cationic group including tertiary amine, N-oxide or ammonium groups.

N-oxide or ammonium groups can also be obtained by treatment of the tertiary amine groups with suitable reagents after the reaction between reactants A and B. The presence of at least one cationic group is a basic requirement for dispersing the composition easily in glycol or glycol/water mixtures without using any dispersing agents. Use of compounds which are subject matter of the present invention in compositions without a compound containing at least one cationic group leads to fluorochemical compositions which are not sufficient soluble or dispersible in glycol or water/glycol mixtures.

Furthermore the presence of cationic groups provides a high affinity of the polymer to the anionic cellulose of the preferred substrate paper. This is important for the application of the fluorochemical compounds of the invention, on paper, not only in size-press, but also in wet-end application.

In particular preferred reactant A is a compound of formula (II):

$$R_f\text{—O—}(CF(CF_3)CF_2O)_m CF(CF_3)\text{—CON}(R^1)\text{—}R^2\text{—NH—}R^3\text{—N}(R^4)_2 \quad (II)$$

with $R_f$ and m being as defined above with all their preferred embodiments, $R^1$ being hydrogen or an alkyl group of for example 1 to 4 carbon atoms, $R^2$ and $R^3$ independently being an alkylene of 1 to 15 carbon atoms, and $R^4$ being an alkyl group of 1 to 4 carbon atoms.

Even more preferably, reactant A is a compound of formula (II) with $R^1$ being hydrogen, $R^2$ and $R^3$ being an alkylene of 2 or 3 carbon atoms, and $R^4$ being a methyl group. Examples include $R_f$—O—(CF(CF_3)CF_2O)_m CF(CF_3)—CONH—CH_2—CH_2—NH—CH_2—CH_2—N(CH_3)_2, $R_f$—O—(CF(CF_3)CF_2O)_m CF(CF_3)—CONH—CH_2—CH_2—CH_2—NH—CH_2—CH_2—N(CH_3)_2, $R_f$—O—(CF(CF_3)CF_2O)_m CF(CF_3)—CONH—CH_2—CH_2—CH_2—NH—CH_2—CH_2—CH_2—N(CH_3)_2, $R_f$—O—(CF(CF_3)CF_2O)_m CF(CF_3)—CONH—CH_2—CH_2—NH—CH_2—CH_2—CH_2—N(CH_3)_2.

The polyfunctional isocyanate compound B may be aliphatic or aromatic and is conveniently a non-fluorinated compound. The molecular weight of the polyisocyanate will in general not exceed 1500 g/mol.

Preferably, reactant B is a polyisocyanate with at least 3 isocyanate groups or a mixture of polyisocyanate compounds with more than 2 isocyanate groups per molecule on average, such as for example a mixture of a diisocyanate compound and a polyisocyanate compound with at least 3 isocyanate groups. The polyisocyanate may be aliphatic or aromatic. Examples include hexamethylenediisocyanate, 2,2,4-trimethyl-1,6-hexamethylenediisocyanate, 1,2-ethylenediisocyanate, dicyclohexylmethane-4,4'-diisocyanate, 1,3,6-hexamethylenetriisocyanate, cyclic trimer of hexamethylenediisocyanate, cyclic trimer of isophorondiisocyanate, 4,4'-methylenediphenylenediisocyanate, 4,6-di-(trifluoromethyl)-1,3-benzene diisocyanate, 2,4-toluenediisocyanate, 2,6-toluenediisocyanate, o-, m- and p-xylenediisocyanate, 4,4'-diisocyanatodiphenylether, 3,3'-dichloro-4,4'-diisocyanatodiphenylmethane, 4,5'-diphenyldiisocyanate, 4,4'-diisocyanatobenzyl, 3,3'-dimethoxy-4,4'-diisocyanatodiphenyl, 3,3'-dimethyl-4,4'diisocyanatodiphenyl, 2,2'-dichloro-5,5'-dimethoxy-4,4'-diisocanatodiphenyl, 1,3-diisocyanatobenzene, 1,2 naphthalenediisocyanate, 4-chloro-1,2-naphthalenediisocyanate, 1,3 naphthalenediisocyanate, 1,8-dinitro-2,7-naphthalenediisocyanate, polyphenylenepolyphenylisocyanate, 3-isocyanatomethyl-3,5,5-trimethylcyclohexylisocyanate, polymethylenepolyphenylisocyanate, isocyanates containing self-condensate moieties such as biuret- or isocyanurate-containing polyisocyanates, or azetedinedione-containing diisocyanates.

More preferably reactant B are isocyanates containing internal isocyanate-derived moieties such as biuret-containing tri-isocyanates, such as that available from Bayer as DESMODUR™ N-types, In a particular preferred embodiment reactant B are DESMODUR™ N100, DESMODUR™ N3200, DESMODUR™ N3300, DESMODUR™ N3400 and DESMODUR™ N3600.

The optional co-reactant C is a fluorinated organic compound with one or more isocyanate-reactive groups.

In particular co-reactant C is a compound of formula (III)

$$(R_f\text{—O—}(CF(CF_3)CF_2O)_m CF(CF_3)\text{—X})_n\text{-Q} \quad (III)$$

with $R_f$ and m as being defined above,

X being a carbonyl group,

Q being an organic group or an organic divalent or trivalent liking group bearing a functional or difunctional isocyanate reactive group;

n being 1 or 2.

Preferably, co-reactant C is a compound of formula (III), with Q being an organic group comprising one or two isocyanate-reactive groups including thiol, hydroxyl and amino groups, more preferably amino groups, even more preferably secondary amino groups.

In a particular preferred embodiment, co-reactant C is a compound of formula (IV):

$$(R_f\text{—O—}(CF(CF_3)CF_2O)_m CF(CF_3)\text{—CON}(R^1)\text{—}R^2)_n\text{—N}(R^5)H \quad (IV)$$

with $R_f$, $R^1$, $R^2$, m and n being as defined before with all preferred embodiment, $R^5$ being (if n being 1) hydrogen or an alkyl group of 1 to 4 carbon atoms.

Preferably, the total stoichiometric amount of isocyanate-reactive groups of reactant A and co-reactant C is less than or equal to the total stoichiometric amount of isocyanate groups of reactant B; more preferably, the total stoichiometric amount of isocyanate-reactive groups of reactant A and co-reactant C is from factor 0.8 to 1 of the total stoichiometric amount of isocyanate groups of reactant B.

In one even more preferred embodiment, the total stoichiometric amount of isocyanate reactive groups of reactant A and co-reactant C is from factor 0.9 to 1 of the total stoichiometric amount of isocyanate groups of reactant B.

Preferably, the total stoichiometric amount of isocyanate-reactive groups of co-reactant C is from factor 0 to 10 of the total stoichiometric amount of isocyanate-reactive groups of reactant A, more preferably from 0 to 7 and even more preferably from 0 to 4, even more preferably from 0 to 1.

If the total stoichiometric amount of isocyanate-reactive groups of reactant A and co-reactant C is less than the total stoichiometric amount of isocyanate groups of reactant B, the excess of isocyanate groups are preferably further polymerized through self-polymerisation or reaction with polyfunctional isocyanate-reactive compounds comprising for example water, polyols or polyamines.

Further subject of the invention is a process for the production of a fluorochemical composition, characterized by reacting reactant B with the reactant A and optionally co-reactant C, with the reactants A, B and C having the meaning as described above.

Any sequence of addition of the reactants can be used.

Preferably, reactant A and co-reactant C are simultaneously added to reactant B.

Preferably, the stoichiometric amounts of reactant A, B, and C are as described above.

Preferably, the reactants are reacted at a temperature in the range from 0 to 120° C. and more preferably from 20 to 80° C.; the pressure is between atmospheric pressure and 2 bar and more preferably between atmospheric pressure and 1.2 bar; with a reaction time in the range from 1 minute to 48 hours and preferably from 1 hour to 12 hours.

The reaction can be carried out in the presence or in the absence of a catalyst. Suitable catalysts include amines, tin salts such as dibutyltin dilaureate, dibutyltin diacetate, dibutyltin di(2-ethyl hexanoate), stannous octanoate, stannous oleate, stannous chloride; bismuth salts such as and other known to those skilled in the art. Generally, preferable concentrations of catalysts are from 0.001% to 10% and more preferably from 0.1% to 5% by weight based on the total weight of the reactants.

Preferably, the reaction is carried out in the absence of any catalyst, in particular if the coated articles are used in the food industry.

In another preferred embodiment, the reaction is carried out in an aprotic solvent or in a mixture of aprotic solvents. Preferred solvents are acetone, ethyl acetate, methyl isobutyl keton, cyclohexanone, tetrahydrofurane, diethyl ether, tert.-butyl methyl ether, hydrofluoroethers, such as methoxy nonafluorobutane, trifluorotoluene, 1,3-Bis(trifluoromethyl) benzene and mixtures thereof.

Unreacted reactant B can be removed by washing with non fluorinated organic solvents, in which the fluorochemical composition is insoluble.

Further subject of the invention is an aqueous dispersion or solution of the fluorochemical composition.

Preferably, the dispersion or the solution comprises from 0.5 to 40% by weight, the % by weight based in the total weight of the dispersion or solution of the fluorochemical composition, more preferably from 5 to 30%.

Therefore, the fluorochemical composition is dispersed or dissolved, preferably in water, wherein the dispersion or the solution may comprise an additional co-solvent.

The co-solvent for the dispersion or solution is preferably water soluble or at least partially water soluble, more preferably the co-solvent has at least one hydroxyl group, even more preferably the co-solvent is a glycol. In a preferred embodiment the co-solvent is selected from the group consisting of ethylene glycol, diethylene glycol, triethylene glycol, polyethylene glycol, propylene glycol, dipropylene glycol, tripropylene glycol, polypropylene glycol, hexamethylene glycol, hexylene glycol, polytetrahydrofuran, monoalkyl ethers of these glycols, and mixtures of these solvents.

In case a co-solvent is used, this is slowly added to the reaction mixture while any solvent used during the preparation of compound is distilled of, and the resulting product is then neutralized with acid and then water is added.

The distillation of the solvents of the reaction is preferably done under vacuum.

The acid which is used for neutralization, is preferably selected from the group consisting of acetic acid and lactic acid, adipic acid, benzoic acid, caprilic acid, citric acid, formic acid, azelaic acid, boric acid, isophtalic acid, itaconic acid, lauric acid, maleic acid, malic acid, oxalic acid, phosphoric acid, phthalic acid, pyromellitic acid, succinic acid, terephthalic acid, ascorbic acid, hypophosphorous acid, propionic acid, sulphonic acid, sodium hydrogen sulfate or p-toluenesulfonic acid, glutaric acid, p-hydroxybenzoic acid, resin acids and rosin acids, salicylic acid, sebacic acid.

Optionally, the fluorochemical composition of the instant invention can be dispersed or dissolved in a co-solvent or mixtures without water, with co-solvents as defined above.

The composition is dispersed or dissolved at a temperature in the range from 25 to 200° C., preferably 25 to 150° C., in particular from 25 to 100° C.

A further subject of the invention is the use of the fluorochemical composition, preferably in form of the dispersion or the solution, for the treatment of paper, textile and leather in order to render the substrate oil repellent.

Moreover the instant invention relates to paper sheets treated with the solutions or dispersions comprising the fluorochemical composition. The fluorochemical composition of the present invention can be used for the paper sizing by using the application methods known in the prior art. For example, it can be applied by surface treatment of the already formed paper: size press and/or coating. Another method is the wet-end, which is an application in the pulp slurry.

For said application, paper, cardboard etc. are treated with a dispersion or a solution of the fluorochemical composition in a suitable medium, water or water and solvent mixture.

In the case of surface treatment, the fluorochemical composition can be applied by spreading, dipping, coating or size press. In a typical application by coating, the fluorochemical composition is used in an amount of 0.2 to 2% by weight with respect to the used coating suspension, said suspension may contain mineral fillers such as calcium carbonate, kaolin, titanium dioxides and binders for example for pigments based on styrene-butadiene copolymers, acrylic copolymers or copolymers containing vinyl acetate. In a typical application by paper sizing in size-press, the fluorochemical composition is used in an amount of 0.2 to 2% by weight with respect to the paper, in the form of an aqueous suspension, said suspension being fed at a temperature from 20 to 90° C. among the cylinders of the size-press equipment. Other additives such for example starches, functionalized starches, polyvinyl alcohols, carboxymethylcellulose, melamine resins, urea-formaldehyde resins, compounds containing aldehyde groups, acrylic resins, styrene-butadiene copolymers, can be added to the suspension. Defoamers are generally added to improve the machine runnability.

Drying can take place at a temperature in the range from 90 to 130° C. according to the usual techniques used in the paper industry.

The dispersion or the solution of the fluorochemical composition may also contain other products such as known additives, necessary to maintain, improve or change the properties of paper, such as being described above.

It was found that an isocyanate-reactive fluorochemical polyether bearing at least one cationic group, when reacted with a polyfunctional isocyanate, provides for a PFOA/PFOS free fluorochemical compound showing unexpected good performance when used on paper. In addition, the resulting polymers have a good thermal stability.

EXAMPLES

Test Methods

KIT Test:

The Kit test is a procedure to characterize the resistance of papers to grease. The Kit test involves applying test solutions numbered from 1 to 16, to the sample under evaluation. The test is carried out under the guidelines of Tappi test method for grease resistance for paper and paperboard T 559. When making up the kit solutions, weight measurements are used for castor oil as its high viscosity makes volume measurements less accurate.

| Kit No | Castor Oil [g/ml] | Toluene [ml] | n-heptane [ml] |
|---|---|---|---|
| 1 | 96.90/100 | 0 | 0 |
| 2 | 87.21/90 | 5 | 5 |
| 3 | 77.52/80 | 10 | 10 |
| 4 | 67.83/70 | 15 | 15 |
| 5 | 58.14/60 | 20 | 20 |
| 6 | 48.45/50 | 25 | 25 |
| 7 | 38.76/40 | 30 | 30 |
| 8 | 29.07/30 | 35 | 35 |
| 9 | 19.38/20 | 40 | 40 |
| 10 | 9.69/10 | 45 | 45 |
| 11 | 0 | 50 | 50 |
| 12 | 0 | 45 | 55 |
| 13 | 0 | 35 | 65 |
| 14 | 0 | 25 | 75 |
| 15 | 0 | 15 | 85 |
| 16 | 0 | 0 | 100 |

The kit tests are carried out in a well illuminated fume cupboard using a dark board to show penetration as darker spots.
1. Place each test specimen on the chosen surface, which must be clean and dry, test facing upwards.
2. Choose an intermediate Kit test solution and carefully, without touching the sample with the dropping pipette, apply a streak approximately 2 cm long to the sample and start the timer.
3. After 15 s quickly remove the excess test solution with a clean tissue, applying the minimum pressure to the paper surface, and immediately examine the test area.
    A failure is denoted either by a darkening of the test specimen, if using a dark background, or bright light spot, if using a light box.
    The change in coloration results from wetting of the specimen, due to penetration of the test solution into the paper sheet.
    If the area under test is not examined immediately then evaporation of the volatile components of the test solution will occur and the sample may regain its original appearance and be scored as a pass.
4. If the specimen fails this first test then select an untested area of the same sheet and repeat using a lower numbered solution.
    Repeat until the highest numbered Kit solution that rests on the surface for 15 seconds without causing failure is identified.
5. If the specimen passes this first test, repeat the test on an untested area of the sample using a higher numbered Kit solution.
    Repeat until the highest numbered Kit solution that rests on the surface for 15 seconds without causing failure is identified.
    The highest numbered kit solution which passes is the kit rating for the specimen.
    The test should be done at least in duplicate.
    Oil Absorbency Test:
    A square paper sample of 15×15 cm is cut using a template. The test sample is conditioned (23° C./50% Relative moisture) and weighed on the balance, the weight being recorded for calculation of the oil pickup after the test is complete. The test oil is dispensed into a measuring cylinder, an amount of 7 to 8 ml being required for the test. The oil is poured quickly onto the surface of the test sample in an approximately spiral/square pattern of 10×10 cm. Immediately afterwards a filter paper of 12×12 cm is placed onto the oil, so that the oil is covered completely. The oil penetrates immediately into the filter paper, and spreads quickly so that the whole test area of 12×12 cm is contacted with oil. The timer is started simultaneously.

The test is run for 10 minutes. Then the filter paper is removed from the test sample Immediately afterwards the residual oil on the test sample is blotted, and then wiped away using an absorbent tissue until the sample is free of surface oil. The sample is reweighed after the test and the gravimetric pickup of oil is calculated—this is referred to as the "Corn Oil Absorbency":

$$CornOilAbsorbency = \frac{(W2 - W1)}{S}$$

W1=Weight of sample before test
W2=Weight of sample after test
S=Surface area in contact with oil The resulting Corn oil Absorbency value is reported in g/m². The test may be repeated in order to ensure a statistically significant result is obtained.

Example 1

194.7 g of Polyhexafluoropropylene oxide methylester (poly-HFPO-methylester), prepared according to WO/2009/118348, Mw 1947 g/mol, free of oligomer with Mw less than 1000 g/mol, is charged into a glass reactor equipped with thermometer, mechanic stirrer and vacuum distillation device and cooled down to −10° C. 16.0 g of N'-(3-Aminopropyl)-N,N-dimethylpropane-1,3-diamine are slowly added under stirring and by maintaining the temperature at −10° C.-0° C. The mixture is then further stirred over night. The resulting methanol is removed under vacuum and a compound of the formula (1) was obtained:

$$CF_3CF_2CF_2O(CF(CF_3)CF_2O)_nCF(CF_3)$$
$$CONHCH_2CH_2CH_2NHCH_2CH_2CH_2N(CH_3)_2 \quad (1)$$

Examples 2

40.0 g of Polyhexafluoropropylene oxide methylester (poly-HFPO-methylester), prepared according to WO/2009/118348, Mw 1905 g/mol, free of oligomer with Mw less than 1000 g/mol, is charged into a glass reactor equipped with thermometer, mechanic stirrer and vacuum distillation device and cooled down to −10° C. 3.36 g of N'-(3-Aminopropyl)-N,N-dimethylpropane-1,3-diamine are slowly added under stirring and by maintaining the temperature at −10° C.-0° C. The mixture is then further stirred over night. The resulting methanol is removed under vacuum and an amide like described in formula (1), but with a lower molecular weight was obtained.

Examples 3-9

The table 1 contains compounds which can be used as reactant A or co-reactant C. They can be prepared similarly to the method described in Example 1 or 2 by using the corresponding starting materials.

TABLE 1

Synthesis of polyhexafluoropropylene oxide amides (poly-HFPO-amides)

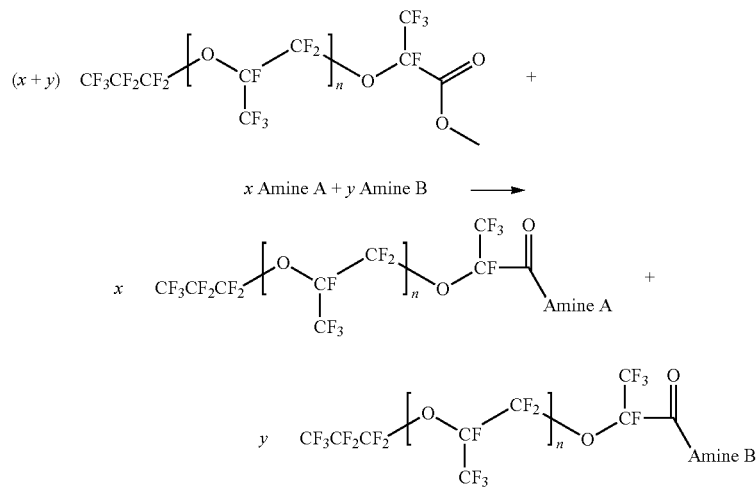

| Example | $R^i$ | $R^{ii}$ | $R^{iii}$ |
|---|---|---|---|
| 3 | H | —CH$_2$CH$_2$CH$_2$— | —CH$_3$ |
| 4 | —CH$_3$ | —CH$_2$CH$_2$CH$_2$— | —CH$_3$ |
| 5 | H | —CH$_2$CH$_2$— | —CH$_2$CH$_2$NH$_2$ |
| 6 | H | —CH$_2$CH$_2$— | —CH$_2$CH$_2$N(CH$_3$)$_2$ |
| 7 | H | —CH$_2$CH$_2$CH$_2$— | —CH$_2$CH$_2$N(CH$_3$)$_2$ |
| 8 | —CH$_3$ | —CH$_2$CH$_2$CH$_2$— | —CH$_2$CH$_2$CH$_2$N(CH$_3$)$_2$ |
| 9 | H | —CH$_2$CH$_2$— | —CH$_2$CH$_2$CH$_2$N(CH$_3$)$_2$ |

Example 10

58.41 g of Polyhexafluoropropylene oxide methylester (poly-HFPO-methylester), prepared according to WO/2009/118348, Mw 1947 g/mol, free of oligomer with Mw less than 1000 g/mol, is charged into a glass reactor equipped with thermometer, mechanic stirrer and vacuum distillation device and cooled down to −10° C. A mixture of 3.20 g of N'-(3-Aminopropyl)-N,N-dimethylpropane-1,3-diamine and 0.89 g 3-Amino-1-methylaminopropane are slowly added under stirring and by maintaining the temperature at −10° C.-0° C. The mixture is then further stirred over night. The resulting methanol is removed under vacuum and a mixture of compounds of the formula (10a) and (10b) in a ratio 2:1 was obtained:

$$CF_3CF_2CF_2O(CF(CF_3)CF_2O)_nCF(CF_3)$$
$$CONHCH_2CH_2CH_2NHCH_2CH_2CH_2N(CH_3)_2 \quad (10a)$$

$$CF_3CF_2CF_2O(CF(CF_3)CF_2O)_nCF(CF_3)$$
$$CONHCH_2CH_2CH_2NH(CH_3) \quad (10b)$$

Examples 11-26

The table 2 which follow contain mixtures of reactant A and co-reactant C. They can be prepared similarly to the method described in Example 10 by using the corresponding starting materials. They can also be obtained by mixing of the single components, prepared by the method described in example 1 or 2.

TABLE 2

Synthesis of mixtures of polyhexafluoropropylene oxide amides (poly-HFPO-amides)

$x$ Amine A + $y$ Amine B ⟶

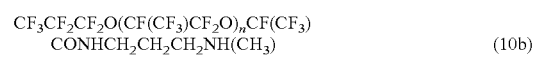

| Ex. | x | y | Amine A | Amine B |
|---|---|---|---|---|
| 11 | 3 | 1 | H$_2$NCH$_2$CH$_2$CH$_2$NHCH$_2$CH$_2$CH$_2$N(CH$_3$)$_2$ | H$_2$NCH$_2$CH$_2$CH$_2$NH(CH$_3$) |
| 12 | 1.7 | 1 | " | " |
| 13 | 3 | 1 | " | H$_2$NCH$_2$CH$_2$NHCH$_2$CH$_2$NH$_2$ |
| 14 | 2 | 1 | " | " |
| 15 | 2 | 1 | H$_2$NCH$_2$CH$_2$CH$_2$NHCH$_2$CH$_2$N(CH$_3$)$_2$ | H$_2$NCH$_2$CH$_2$CH$_2$NH(CH$_3$) |
| 16 | 1.5 | 1 | " | " |
| 17 | 3 | 1 | " | " |
| 18 | 2 | 1 | H$_2$NCH$_2$CH$_2$CH$_2$NHCH$_2$CH$_2$CH$_2$N(CH$_3$)$_2$ | " |
| 19 | 3 | 1 | " | " |
| 20 | 2 | 1 | H$_2$NCH$_2$CH$_2$NHCH$_2$CH$_2$CH$_2$N(CH$_3$)$_2$ | " |
| 21 | 3 | 1 | " | " |
| 22 | 1.7 | 1 | " | H$_2$NCH$_2$CH$_2$NHCH$_2$CH$_2$NH$_2$ |
| 23 | 2 | 1 | " | " |
| 24 | 3 | 1 | " | " |

TABLE 2-continued

Synthesis of mixtures of polyhexafluoropropylene oxide amides (poly-HFPO-amides)

$$(x+y)\ CF_3CF_2CF_2\!\!-\!\!\left[\!O\!-\!\underset{CF_3}{\underset{|}{CF}}\!-\!CF_2\!\right]_n\!\!-\!\!O\!-\!\underset{CF_3}{\underset{|}{CF}}\!-\!C(\!=\!O)\!-\!O\!-\!CH_3\ +$$

$$x\text{ Amine A} + y\text{ Amine B} \longrightarrow$$

$$x\ CF_3CF_2CF_2\!\!-\!\!\left[\!O\!-\!\underset{CF_3}{\underset{|}{CF}}\!-\!CF_2\!\right]_n\!\!-\!\!O\!-\!\underset{CF_3}{\underset{|}{CF}}\!-\!C(\!=\!O)\!-\!\text{Amine A}\ +$$

$$y\ CF_3CF_2CF_2\!\!-\!\!\left[\!O\!-\!\underset{CF_3}{\underset{|}{CF}}\!-\!CF_2\!\right]_n\!\!-\!\!O\!-\!\underset{CF_3}{\underset{|}{CF}}\!-\!C(\!=\!O)\!-\!\text{Amine B}$$

| Ex. | x | y | Amine A | Amine B |
|---|---|---|---|---|
| 25 | 4 | 1 | $H_2NCH_2CH_2CH_2NHCH_2CH_2CH_2N(CH_3)_2$ | " |
| 26 | 4 | 1 | " | $H_2NCH_2CH_2CH_2NH(CH_3)$ |

Example 27

62.0 g reaction product of example 10 is diluted with 70 g tert.-Butyl methyl ether (TBME). Then 6.4 g Desmodur N3300 (polyfunctional isocyanate resin from BAYER based on hexamethylene diisocyanate; eq wt=197) is added and the polycondensation as well as the post crosslinking reaction are carried out at 20-40° C. After reaction has completed, the TBME phase is aspirated out and the polymer phase is washed a second time with 70 g TBME. After removing of the TBME phase 1.0 g acetic acid is added. Then the remaining TBME is distilled off under reduced pressure (400 to 100 mbar/~50-60° C.). During distillation 102 g propylene glycol is added. Then a second portion of 0.8 g acetic acid and at the end 228 g water is added slowly. The mixture is stirred for additional 1 h until homogenisation is completed. Then the pH is adjusted with acetic acid to 4-5. The resulting polymer dispersion can be used directly for surface treatment of textile fibers and leather and in particular on paper or cardboard. In case of paper, for example, it can be applied by spreading, dipping, coating or size press of the already formed paper. Another method for paper is the wet-end application, which is an application in the pulp slurry. In all cases the substrates treated with the described composition, show excellent grease and oil release properties.

Examples 28-78

The table 3 which follow contain compositions which can be prepared similarly to the method described in Example 27 by using the corresponding starting materials.

TABLE 3

| Example | Poly-HFPO-amide | Isocyanate |
|---|---|---|
| 28 | Ex. 11 | DESMODUR ™ N3300 |
| 29 | Ex. 11 | DESMODUR ™ N3200 |
| 30 | Ex. 11 | DESMODUR ™ N100 |
| 31 | Ex. 12 | DESMODUR ™ N3300 |
| 32 | Ex. 12 | DESMODUR ™ N3200 |
| 33 | Ex. 13 | DESMODUR ™ N3400 |
| 34 | Ex. 14 | DESMODUR ™ N3400 |
| 35 | Ex. 14 | DESMODUR ™ N3600 |
| 36 | Ex. 15 | DESMODUR ™ N3200 |
| 37 | Ex. 15 | DESMODUR ™ N3300 |
| 38 | Ex. 16 | DESMODUR ™ N3600 |
| 39 | Ex. 16 | DESMODUR ™ N3300 |
| 40 | Ex. 16 | DESMODUR ™ N3200 |
| 41 | Ex. 17 | DESMODUR ™ N3300 |
| 42 | Ex. 17 | DESMODUR ™ N3600 |
| 43 | Ex. 18 | DESMODUR ™ N3300 |
| 44 | Ex. 18 | DESMODUR ™ N3200 |
| 45 | Ex. 19 | DESMODUR ™ N3300 |
| 46 | Ex. 19 | DESMODUR ™ N3200 |
| 47 | Ex. 20 | DESMODUR ™ N3600 |
| 48 | Ex. 20 | DESMODUR ™ N3300 |
| 49 | Ex. 21 | DESMODUR ™ N3600 |
| 50 | Ex. 21 | DESMODUR ™ N3200 |
| 51 | Ex. 21 | DESMODUR ™ N3300 |
| 52 | Ex. 22 | DESMODUR ™ N3300 |
| 53 | Ex. 22 | DESMODUR ™ N3600 |
| 54 | Ex. 23 | DESMODUR ™ N3200 |
| 55 | Ex. 24 | DESMODUR ™ N3300 |
| 56 | Ex. 24 | DESMODUR ™ N3200 |
| 57 | Ex. 25 | DESMODUR ™ N3300 |
| 58 | Ex. 26 | DESMODUR ™ N3300 |
| 59 | Ex. 2 | DESMODUR ™ N3300 |
| 60 | Ex. 2 | DESMODUR ™ N3200 |
| 61 | Ex. 2 | DESMODUR ™ N3600 |
| 62 | Ex. 2 | DESMODUR ™ N100 |
| 63 | Ex. 3 | DESMODUR ™ N3600 |
| 64 | Ex. 3 | DESMODUR ™ N3300 |
| 65 | Ex. 3 | DESMODUR ™ N3400 |
| 66 | Ex. 4 | DESMODUR ™ N3300 |
| 67 | Ex. 4 | DESMODUR ™ N100 |
| 68 | Ex. 6 | DESMODUR ™ N3300 |
| 69 | Ex. 6 | DESMODUR ™ N3300 |
| 70 | Ex. 7 | DESMODUR ™ N3200 |
| 71 | Ex. 7 | DESMODUR ™ N3400 |
| 72 | Ex. 7 | DESMODUR ™ N3600 |

TABLE 3-continued

| Example | Poly-HFPO-amide | Isocyanate |
|---|---|---|
| 73 | Ex. 7 | DESMODUR ™ N100 |
| 74 | Ex. 8 | DESMODUR ™ N3300 |
| 75 | Ex. 8 | DESMODUR ™ N3300 |
| 76 | Ex. 9 | DESMODUR ™ N3300 |
| 77 | Ex. 9 | DESMODUR ™ N3200 |
| 78 | Ex. 9 | DESMODUR ™ N3600 |

Comparative Examples C1

This example demonstrated a fluorochemical composition prepared as in example 1 or 2, but bearing no cationic group when reacted with a polyfunctional isocyanate.

200.0 g reaction product of example 3 is diluted with 200 g tert.-Butyl methyl ether (TBME). Then 21.1 g Desmodur N3300 (polyfunctional isocyanate resin from BAYER based on hexamethylene diisocyanate; eq wt=197) is added and the polycondensation as well as the post crosslinking reaction are carried out at 20-40° C. After reaction has completed, the TBME phase is aspirated out and the polymer phase is washed a second time with 70 g TBME. After removing of the TBME phase 1.0 g acetic acid is added. Then the remaining TBME is distilled off under reduced pressure (400 to 100 mbar/~50-60° C.). During distillation 102 g propylene glycol is added, but the resulting fluorochemical compound is unsoluble and not dispersible in propylene glycol or propylene glycol/water mixtures or other glycols listed above or other glycol/water mixtures.

Dispersibility in glycols or glycol/water mixtures is crucial for application on the substrates listed above.

The table 4 shows compositions which can be prepared similarly to the method described in comparative example C1 by using Poly-HFPO-amide from example 3, 4 or 5, so the resulting fluorochemical compositions also contain no cationic group. All these compositions were not soluble or dispersible in used glycol or glycol/water mixture.

TABLE 4

| Example | Poly-HFPO-amide | Isocyanate | Solvent |
|---|---|---|---|
| C2 | Ex. 4 | DESMODUR ™ N3300 | Propylene glycol |
| C3 | Ex. 5 | DESMODUR ™ N3300 | Propylene glycol/water (1:2) |
| C4 | Ex. 3 | DESMODUR ™ N3300 | Diethylene glycol/water (1:1) |
| C5 | Ex. 3 | DESMODUR ™ N3200 | Propylene glycol/water (1:2) |
| C6 | Ex. 5 | DESMODUR ™ N3200 | Propylene glycol |
| C7 | Ex. 4 | DESMODUR ™ N3300 | Propylene glycol/water (1:2) |
| C8 | Ex. 4 | DESMODUR ™ N3200 | Propylene glycol/water (1:1) |
| C9 | Ex. 4 | DESMODUR ™ N3200 | Diethylene glycol |

The invention claimed is:

1. Fluorochemical composition comprising a dispersion and/or a solution of a fluorinated compound, wherein said fluorinated compound comprises a reaction product of at least two reactants A and B wherein reactant A being a compound of formula (I);

$$R_f\text{—}O\text{—}(CF(CF_3)CF_2O)_m CF(CF_3)\text{—}X\text{—}Y\text{—}Z \quad (I)$$

with
$R_f$ being a perfluorinated alkyl group,
m being from 3 to 25;
X being a carbonyl group or CH2;
Y being an organic divalent or trivalent linking group bearing a functional or difunctional isocyanate reactive group;
Z being an organic group bearing at least one cationic group,
reactant B being a polyfunctional isocyanate or a mixture thereof
and optionally one or more isocyanate-reactive co-reactants C.

2. Fluorochemical composition according to claim 1, wherein A is a mixture of compounds of formula (I), with m being from 4 to 22 and has an average molecular weight of from 750 to 4000 g/mol.

3. Fluorochemical composition according to claim 1, wherein A further comprises 0 to 10% by weight, the % by weight based on the total weight of reactant A of compounds with a molecular weight of less than 750 g/mol.

4. Fluorochemical composition according to claim 1, wherein reactant A comprises a compound of formula (I), wherein Z is a linking group bearing at least one cationic group comprising one or more tertiary amine, N-oxide or ammonium groups, which may also be obtained by treatment of the one or more tertiary amine groups with suitable reagent after reaction between reactants A and B.

5. Fluorochemical composition according to claim 1, wherein reactant A is a compound of formula (II):

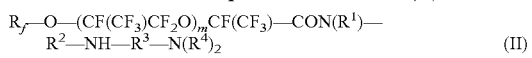

$$R_f\text{—}O\text{—}(CF(CF_3)CF_2O)_m CF(CF_3)\text{—}CON(R^1)\text{—} \\ R^2\text{—}NH\text{—}R^3\text{—}N(R^4)_2 \quad (II)$$

with,
$R^1$ being hydrogen or an alkyl group,
$R^2$ and $R^3$ independently being an alkylene of 1 to 15 carbon atoms, and
$R^4$ being an alkyl group of 1 to 4 carbon atoms,
$R_f$ being a perfluorinated alkyl group, and
m being from 3 to 25.

6. Fluorochemical composition according to claim 1, wherein the polyfunctional isocyanate compound B may be aliphatic and/or aromatic and is a non-fluorinated compound with a molecular weight not exceeding 1500 g/mol.

7. Fluorochemical composition according to claim 1, wherein the reactant B is an isocyanate containing one or more internal isocyanate-derived moieties.

8. Fluorochemical composition according to claim 1, wherein the co-reactant C is a compound of formula (III)

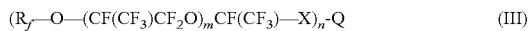

$$(R_f\text{—}O\text{—}(CF(CF_3)CF_2O)_m CF(CF_3)\text{—}X)_n\text{-}Q \quad (III)$$

with,
X being a carbonyl group,
Q being an organic group or an organic divalent or trivalent liking group bearing a functional or difunctional isocyanate reactive group;
n being 1 or 2,
$R_f$ being a perfluorinated alkyl group, and
m being from 3 to 25.

9. Fluorochemical composition according to claim 8, wherein co-reactant C is a compound of formula (III), with Q being an organic group comprising one or two isocyanate-reactive groups including one or more of thiol, hydroxyl and amino groups.

10. Fluorochemical composition according to claim 8, wherein co-reactant C is a compound of formula (III), with Q being an organic group comprising one or two isocyanate-reactive groups including one or more amino groups.

11. Fluorochemical composition according to claim 1, wherein co-reactant C is a compound of formula (IV):

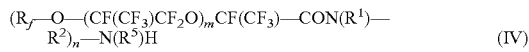

$R^5$ being (if n being 1) hydrogen or an alkyl group of 1 to 4 carbon atoms,
$R^1$ being hydrogen or an alkyl group,
$R^2$ being an alkylene of 1 to 15 carbon atoms,
n being 1 or 2,
$R_f$ being a perfluorinated alkyl group, and
m being from 3 to 25.

12. Fluorochemical composition according to claim 1, wherein the total stoichiometric amount of isocyanate reactive groups of reactant A and co-reactant C is from factor 0.9 to 1 of the total stoichiometric amount of isocyanate groups of reactant B.

13. Process for the production of a fluorochemical composition according to claim 1, comprising reacting reactant B with the reactant A and optionally co-reactant C at a temperature in the range from 0 to 120° C. and a pressure from atmospheric pressure to 2 bar.

14. Process according to claim 13, wherein the reaction is carried out in an aprotic solvent or in a mixture of aprotic solvents.

15. Dispersion and/or solution comprising 0.5 to 40% by weight of a fluorochemical composition according to claim 1.

16. Dispersion and/or solution according to claim 15 comprising an additional co-solvent.

17. Dispersion and/or solution according to claim 16, wherein the co-solvent is water soluble or at least partially water soluble.

18. Dispersion and/or solution according to claim 16, wherein the co-solvent has at least one hydroxyl group.

19. Dispersion and/or solution according to claim 16, wherein the co-solvent is a glycol.

20. Paper sheet treated with a solution and/or dispersion comprising a fluorochemical composition according to claim 1.

21. A fibrous substance treated with a fluorochemical composition according to claim 1 to make said substance oil and/or water repellant.

22. A fluorochemical composition according to claim 1 capable of being used for already formed paper size press and/or coating or a wet-end application.

23. Fluorochemical composition according to claim 1, wherein A further comprises 0 to 0.1% by weight, the % by weight based on the total weight of reactant A, of compounds with a molecular weight of less than 750 g/mol.

24. Fluorochemical composition according to claim 1, wherein the reactant B is an isocyanate containing one or more internal isocyanate-derived moieties comprising biuret-containing tri-isocyanates.

25. Fluorochemical composition according to claim 1, wherein A further comprises 0 to 5% by weight, the % by weight based on the total weight of reactant A, of compounds with a molecular weight of less than 750 g/mol.

26. Fluorochemical composition according to claim 1, wherein A further comprises 0 to 1% by weight, the % by weight based on the total weight of reactant A, of compounds with a molecular weight of less than 750 g/mol.

* * * * *